(12) United States Patent
Li et al.

(10) Patent No.: US 10,080,017 B2
(45) Date of Patent: Sep. 18, 2018

(54) REDUCTION OF I-PULSING ARTIFACTS

(71) Applicant: Avago Technologies General IP (Singapore) Pte. Ltd., Singapore (SG)

(72) Inventors: Junlin Li, San Jose, CA (US); Alexander Garland MacInnis, Los Altos, CA (US); Brad Albert Delanghe, San Jose, CA (US); Lei Zhang, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 1024 days.

(21) Appl. No.: 13/832,799

(22) Filed: Mar. 15, 2013

(65) Prior Publication Data

US 2014/0177717 A1   Jun. 26, 2014

Related U.S. Application Data

(60) Provisional application No. 61/746,056, filed on Dec. 26, 2012.

(51) Int. Cl.
| | |
|---|---|
| H04N 11/02 | (2006.01) |
| H04N 19/86 | (2014.01) |
| H04N 19/159 | (2014.01) |
| H04N 19/136 | (2014.01) |
| H04N 19/40 | (2014.01) |

(52) U.S. Cl.
CPC ..... *H04N 19/00909* (2013.01); *H04N 19/136* (2014.11); *H04N 19/159* (2014.11); *H04N 19/86* (2014.11); *H04N 19/40* (2014.11)

(58) Field of Classification Search
CPC ................................................ H04N 19/00909
USPC ........................................ 375/240.01–240.29
See application file for complete search history.

(56) References Cited

U.S. PATENT DOCUMENTS

| | | | | |
|---|---|---|---|---|
| 6,088,393 A | * | 7/2000 | Knee | .................. H04N 21/2365 348/719 |
| 6,252,974 B1 | * | 6/2001 | Martens | .................. G06T 7/262 345/422 |
| 6,952,211 B1 | * | 10/2005 | Cote | ......................... G06T 1/20 345/473 |
| 8,036,270 B2 | * | 10/2011 | Zhao | .................... H04N 19/172 348/447 |
| 9,414,091 B2 | * | 8/2016 | Pinhasov | ............... H04N 19/61 |
| 2004/0213349 A1 | * | 10/2004 | Zador | .................... G06T 9/008 375/240.22 |
| 2007/0016427 A1 | * | 1/2007 | Thumpudi et al. | ........... 704/500 |

(Continued)

*Primary Examiner* — Leron Beck
(74) *Attorney, Agent, or Firm* — Foley & Lardner LLP

(57) ABSTRACT

Various methods and systems are provided for reduction of I-pulsing artifacts. In one example, a portion of a picture is modified to be encoded as an I picture based in part upon a picture that precedes the picture. The modification can reduce an I-pulsing artifact associated with the I picture. The modified picture is intra-coded for inclusion in a series of encoded pictures, which may then be transmitted. In another example, an encoder includes adaptive pre-processing circuitry and intra-encoding processing circuitry. The pre-processing circuitry modifies a portion of a first picture based in part upon a second picture that precedes the first picture in a series of video pictures. For example, the modification may be based upon coding noise associated with the preceding picture. The intra-encoding processing circuitry encodes the modified picture as an I picture.

22 Claims, 7 Drawing Sheets

(56) References Cited

U.S. PATENT DOCUMENTS

| | | | |
|---|---|---|---|
| 2008/0247462 A1* | 10/2008 | Demos | 375/240.03 |
| 2008/0291998 A1* | 11/2008 | Lim et al. | 375/240.12 |
| 2010/0232497 A1 | 9/2010 | MacInnis et al. | |
| 2014/0119434 A1* | 5/2014 | Zhang | H04N 19/176 375/240.03 |

* cited by examiner

REDUCTION OF I-PULSING ARTIFACTS

CROSS REFERENCE TO RELATED APPLICATIONS

This application claims priority to U.S. provisional application entitled "Reduction of I-Pulsing Artifacts" having Ser. No. 61/746,056, filed Dec. 26, 2012, the entirety of which is hereby incorporated by reference.

BACKGROUND

In a typical video coding system, pictures are inter-coded or intra-coded for storage and/or transmission. An intra-coded (I) picture is independently encoded without referring to any neighboring inter-coded pictures. Inter-coded pictures include predicted (P) pictures and bidirectionally predicted (B) pictures. P pictures are encoded based upon a preceding I or P picture and B pictures are encoded based upon preceding and following I and/or P pictures. The series of encoded pictures may then be transmitted and/or stored for subsequent processing.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
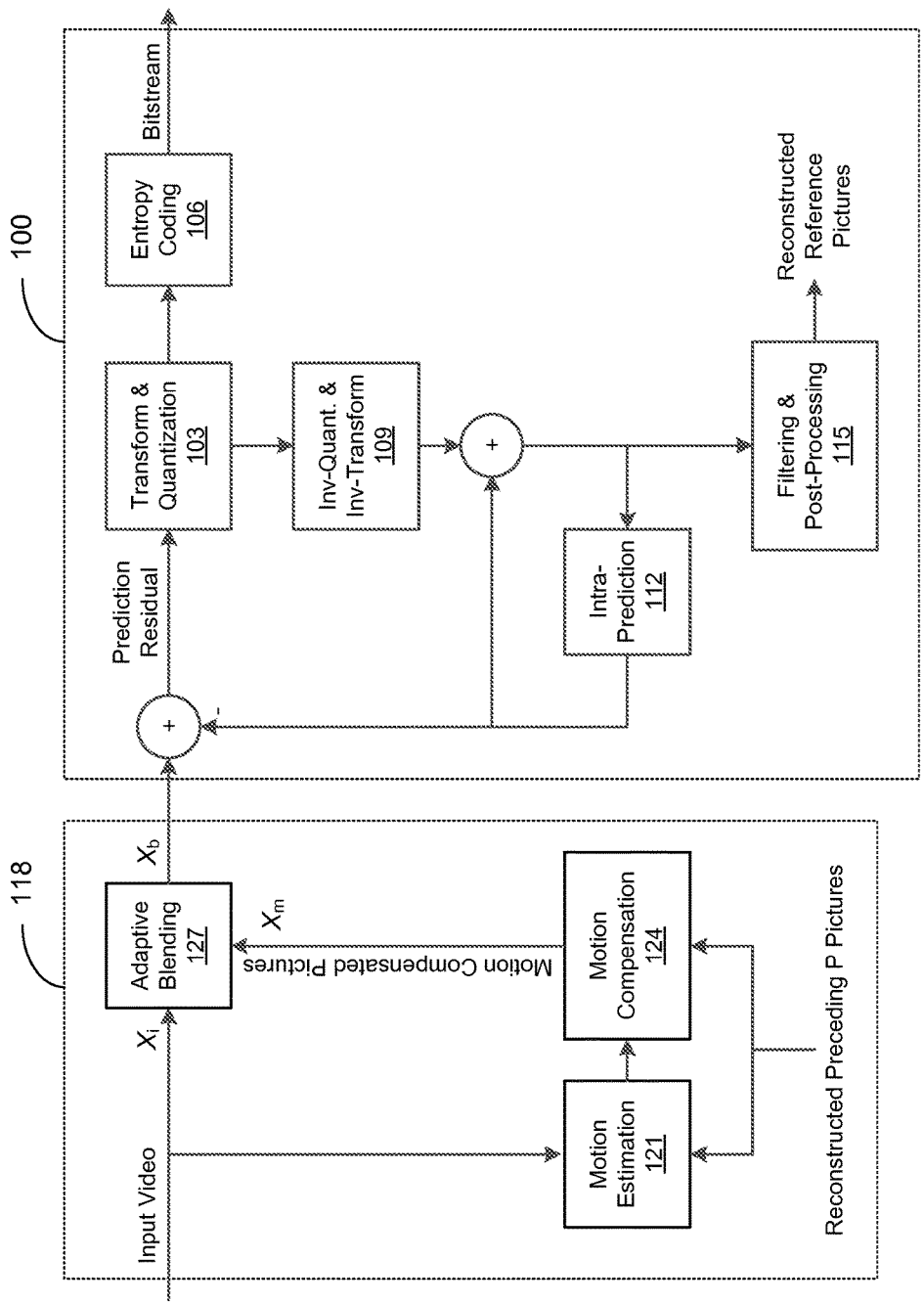
FIGS. 1-5 are graphical representations of examples of video encoding to reduce I-pulsing artifacts in accordance with various embodiments of the present disclosure.

Disclosed herein are various embodiments related to reduction of I-pulsing artifacts. Reference will now be made in detail to the description of the embodiments as illustrated in the drawings, wherein like reference numbers indicate like parts throughout the several views.

Various devices utilize video (or media processing) architectures for encoding, decoding, and/or transcoding of video or other media streams. Depending on the embodiment, a device may comprise a single media device such as an enhanced television, smartphone, computing device (e.g., server, desktop, laptop, tablet or hand-held computing device), video camera, etc. A combination of devices may also be arranged to provide the underlying functionality. An example of such a combination might be a set top box or video player and a separate television communicatively coupled to the set top box and/or video player. Media may also be delivered through various pathways from servers such as, e.g., an "On Demand" media server, broadcast media server, etc.

In a typical video coding (or transcoding) system with inter-coded predicted (P) pictures and intra-coded (I) pictures, very visible pulsing artifacts may occur between the transition from P pictures to I pictures, especially at low bit rate. Visible artifacts can occur even if the P pictures and I pictures use the same or very similar quantization parameter (QP) values and hence very similar overall distortion and/or quality. This is because I pictures are independently encoded without referring to any neighboring P pictures, and the properties of the encoding distortion are different for I and P pictures. While there are multiple reasons for I-pulsing, a primary reason may be that coding noise accumulates in P pictures, particularly in successive P pictures where each is predicted from one or more previous P pictures. Because of the different encoding, this noise does not appear in I pictures. As a result, each I picture may appear to be significantly different from the P picture that immediately precedes it. I-pulsing may also be visible when transitioning from a bidirectionally predicted (B) picture to an I picture.

When viewing such video in real time, each transition from a P picture to the next I picture exhibits a visible jump or pulse that can be visible to the viewer. When I pictures are spaced evenly in the video (e.g., every second), the I-pulsing can be more noticeable. I-pulsing is particularly noticeable in content that has slow or no motion, especially where the content is either fairly smooth (e.g., a dirt surface or blue sky), or that has some random-looking details (e.g., trees or grass). In fast moving video, it is generally difficult to see I-pulsing because of the changing scenes. Smoothing out the difference between the I and P (or B) pictures can reduce or eliminate the pulsing artifacts so that the visual quality is improved, especially for low bit-rate video compression. While the following examples of adaptive pre-processing are discussed with respect to a P picture preceding an I picture, the examples are equally applicable to a B picture preceding an I picture. In addition, the adaptive pre-processing may also be applied to intra-coded regions of a picture such as, e.g., rows or blocks of pixels.

Referring to FIG. 1, shown is a graphical representation of an example of video encoding for I pictures in accordance with various embodiments of the present disclosure. Intra-encoding 100 includes various modules including, e.g., transform and quantization 103, entropy coding 106, inverse quantization and inverse transform 109, intra-prediction 112, and filtering and/or post processing 115. For different standards (e.g., H.264/AVC or HEVC), the specific operations for each transform and quantization module 103, entropy coding module 106, inverse quantization and inverse transform module 109 and/or intra-prediction module 112 may be slightly different, and the filtering and/or post-processing module 115 (e.g., deblocking in H.264/AVC and HEVC, and/or sample adaptive offset (SAO) in HEVC) may be optional. During video coding, each coding unit (CU), macro block (MB), and/or other region of an I picture is predicted from the neighboring CU or MBs in the same picture, without referring to any other pictures. This is in contrast to P (or B) pictures that use information from previously coded pictures for encoding. Because of this, the encoding distortion introduced in an I picture can be very different from that in the previous P (or B) pictures. For example, the I picture may have significantly less coding noise or distortion than the preceding P picture, or the I picture may have a different visual quality of noise or distortion than the preceding P picture. When this occurs, I-pulsing artifacts can be present.

FIG. 1 may also represent at least a portion of an encoder or transcoder including processing circuitry that implements modules or functions such as those illustrated. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute encoding functions.

To reduce or eliminate the I-pulsing artifacts, adaptive pre-processing 118 may be applied for I pictures of the video stream. Motion compensated adaptive blending may be applied to the input video pictures prior to the intra-encoding 100. Initially, motion estimation is carried out on an input video picture by, e.g., a motion estimation module 121 using the reconstructed preceding P picture as a reference. One or more motion vectors (MVs) are generated for each MB, CU and/or other region of the image. The motion compensation module 124 may then construct a motion compensated picture based upon the preceding reconstructed video picture (e.g., the reconstructed P picture preceding the I picture) using the estimated MVs. The adaptive blending module 127 may then blend together at least a portion of the input video picture and a corresponding portion of the motion compensated picture before providing the blended picture for intra-encoding 100. The intra-encoding output is still standard-compatible and can be decoded by any standard decoder without any change. In this way, the adaptive blending is only implemented in the encoder and is transparent to the decoder.

The difference between the input video picture and the motion compensated picture (referred to as the motion compensated residual) can also be determined (e.g., calculated) and used to adapt the blending. To minimize the effect on the original input video picture while reducing or eliminating the I-pulsing artifacts, adaptive blending can be applied by, e.g., the adaptive blending module 127 based at least in part upon one or more of the generated MVs and the determined motion compensation residual. The blending may be expressed as follows:

$$X_b = \alpha \cdot X_i + (1-\alpha) \cdot X_m \qquad \text{EQN (1)}$$

where $X_i$ denotes input pixels of the original input video picture, $X_m$ denotes corresponding pixels of the motion compensated picture, $X_b$ denotes corresponding pixels of the blended picture (which is also the input to the intra-encoding 100), and $\alpha$ denotes the blending factor. When $\alpha=1$, the motion compensated pixels ($X_m$) do not have an effect and the result is similar to that of conventional intra encoding. When the blending factor $\alpha$ is less than 1, at least a portion of the pixels ($X_i$) of the input video picture may be modified based upon the motion compensated reconstructed preceding P picture. When $\alpha=0$, the resulting pixels ($X_b$) of the blended picture are the same as the pixels ($X_m$) of the motion compensated picture.

Because I-pulsing artifacts are more visible in static and smooth areas, the blending factor may be designed to adapt based at least in part upon the motion and smoothness of the input video picture as follows:

$$\alpha = f(\sigma^2, MV) \qquad \text{EQN (2)}$$

where MV denotes the motion vector, $\sigma^2$ denotes a measure of the motion compensation residual, and the blending factor function $f(\sigma^2, MV)$ is a decreasing function of the motion vector and the motion compensation residual. The blending factor function f may be a decreasing function and/or a non-linear function. For example, the blending factor may vary in a defined manner (e.g., linearly, quadratically, logarithmically, etc.) over a defined range of values and may remain constant at a maximum value and/or minimum value when outside the defined range. In some cases, a look up table may be used to determine the blending factor. In some implementations, the blending factor function may include other variables. In this way, the blending may be adapted based at least in part upon the determined motion compensation residual and/or one or more MV.

For example, a MV may be compared to a predefined threshold to determine whether to blend the input video picture and the motion compensated picture. In other implementations, a sum of a plurality of MVs (or a sum of the MV magnitudes) may be compared to a predefined threshold. For instance, blending is performed only when the motion (MV) is small enough (e.g., at and/or below the predefined threshold), otherwise no blending is applied. In one embodiment, if the MV is greater than or equal to three pixels/frame, then the pixels are not blended. In some implementations, the blending factor $\alpha$ may be determined for each CU, MB, and/or other region of the input video picture. The adaptive blending may then be carried out by the adaptive blending module 127 on a CU, MB, and/or other region basis.

The amount of blending may also be adjusted based at least in part upon the measure $\sigma^2$ of the motion compensation residual. When the residual is small (e.g., $\sigma^2$ equal to and/or less than a predefined level), more blending may be applied when the content is less changed from the previous picture to the current picture. That is, more blending (or smaller $\alpha$) when the input pixels and the motion-compensated pixels are more similar, and less blending (or larger $\alpha$) when the pixels are less similar. The blending factor function f may also be a function of the quantization parameter (QP) value in use. A maximum degree of blending may be determined based upon the QP. For example, when the QP is small, the maximum degree of blending is small, and when QP is large, the maximum degree of blending is large. In another example, when QP is small, the amount of residual that is considered small for purposes of controlling blending may be less than when QP is large, and when QP is large, the amount of residual that is considered large for purposes of controlling blending may be greater than when QP is small.

As noted above, when the value of the blending function factor $\alpha=0$, the pixels ($X_b$) of the resulting blended picture are the same as the pixels ($X_m$) of the motion compensated previous picture, and hence the picture that is encoded by intra-encoding 100 as the I picture has the pixel values of $X_m$. The encoded I picture may have coding noise that is very similar to the coding noise observed in the preceding P picture. However, due to quantization in the intra-encoding process, the coding noise from the preceding P picture may not be fully or accurately represented. The QP value used for coding the I picture may be reduced with respect to the QP value used for the preceding P picture in order to more accurately code the noise that is associated with the preceding P picture. Decreasing the QP value for the I picture in this way may increase the number of bits used to code the I picture. Similarly, the inclusion of coding noise from a previous picture in the I picture may also increase the number of bits used to code the I picture. Coding noise may be generated during the encoding process of the preceding picture, from the encoded preceding picture, or may be based upon the reconstructed preceding picture. The blending of at least a portion of the image content from the preceding P picture in the I picture may reduce the number of bits used to code the I picture, for example if the P picture has less detail than the input picture. The increased expenditure of bits for the encoded I picture can be worthwhile in terms of subjective video quality, due to the reduction in the I-pulsing artifacts.

Motion estimation and motion compensation are widely used for inter-picture encoding in typical video coding standards, so the same motion estimation and motion compensation functions used for encoding P pictures can also be used in the adaptive pre-processing 118 for I pictures. In this way, software and/or hardware used for motion estimation and motion compensation in inter-picture encoding may also be used for the adaptive pre-processing 118. The adaptive blending 118 may thus be implemented at a fairly low-cost.

In another embodiment, motion estimation is carried out on an input video picture by, e.g., the motion estimation module 121 using the reconstructed preceding P picture as a reference. One or more MVs are generated for each MB, CU, and/or other region of the image. A motion compensated version of the reconstructed preceding P picture is then constructed by the motion compensation module 124 using the determined MVs. The difference between the original input video picture and the motion compensated picture is determined (or calculated). The calculated difference is referred to as a motion compensated residual. The motion compensated residual can be adjusted (e.g., multiplied, weighted, or scaled) by a scale (or weight) factor and the result is added to the original input video picture to form a modified input picture. The modified input picture is then encoded via the intra-encoding 100. The intra-encoding output is still standard-compatible and can be decoded by any standard decoder without any change and thus is transparent to the decoder.

The value of the scale (or weight) factor may be adjusted to emphasize or de-emphasize the degree to which the input video picture is modified. The scale (or weight) factor may be equal to 1, less than 1, or greater than 1. If the scale factor is equal to 1, then the motion compensated residual is added to the input video picture and the multiplication step may be omitted. Addition of the motion compensated residual to the input video picture by the adaptive blending module 127 produces a blended picture that resembles the preceding P picture.

The scale (or weight) factor may be adapted based upon one or more variables associated with each MB, CU and/or other region of the image. A function defining the scale factor may be based upon one or more variables corresponding to the MB, CU and/or other region. For example, in some implementations the scale factor may be adapted based at least in part upon the magnitude of the MVs that are found for each MB, CU and/or other region. In a MB, CU and/or other region where the motion is small or zero, a relatively large scale factor may be applied to the motion compensated residual. In a MB, CU and/or other region where the motion is moderate or large, a relatively small scale factor or a scale factor of zero may be applied. If the scale factor is zero for a MB, CU and/or other region, addition of the motion compensated residual to that portion of the original input video picture may be omitted.

In some implementations, the scale (or weight) factor may be adapted based at least in part upon the value of the quantization parameter (QP) to be applied to each MB, CU and/or other region. Where the QP is relatively large, a relatively large scale factor may be applied to the corresponding MB, CU and/or other region. Where the QP is relatively small, a relatively small scale factor may be applied to the corresponding MB, CU and/or other region.

In some implementations, the scale (or weight) factor may be adapted based at least in part upon the consistency of the MVs found by, e.g., the motion estimation module 121. Where the MVs are relatively consistent within a defined region about a MB, CU, or other region, a relatively large scale factor may be applied to the corresponding MB, CU and/or other region. For example, the difference between the MVs may be compared to a predefined threshold or limit. Where the motion vectors are relatively inconsistent (e.g., when a defined number of MVs have a difference that is larger than the predefined threshold or limit), a relatively small value of scale factor may be applied.

In some implementations, the scale (or weight) factor may be adapted based at least in part upon the amount of detail or activity in each MB, CU or other region. Where the amount of detail and/or activity is relatively small such as, e.g., blue sky, sand beach, stone wall or other relatively uniform surface, a relatively large scale factor may be applied to the corresponding MB, CU and/or other region. Where the amount of detail or activity is relatively large such as, e.g., crowds at a sports event or other scene with active movement, a relatively small scale factor may be applied.

In some implementations, the scale (or weight) factor may be adapted based at least in part upon characteristics of the calculated motion compensated residual. Where the magnitude of the motion compensated residual is relatively large for a MB, CU and/or other region, a relatively small scale factor may be applied to the corresponding MB, CU and/or other region. Where the magnitude of the motion compensated residual is relatively small, a relatively large scale factor may be applied. In some cases, the magnitude of the DC and/or low frequency component (or components) of the motion compensated residual may be determined and used to adapt the scale factor.

Where the magnitude of the DC and/or low frequency component(s) of the motion compensated residual is/are relatively large, a relatively small scale factor may be applied. Where the magnitude of the DC and/or low frequency component(s) of the motion compensated residual is/are relatively small, a relatively large scale factor may be applied. Other characteristics of the motion compensated residual that may be used to adapt the scale factor can include, e.g., luma and/or individual chroma components. For example, the scale factor may be based at least in part upon the DC terms of each of multiple small blocks for each of the components.

Figure 2:
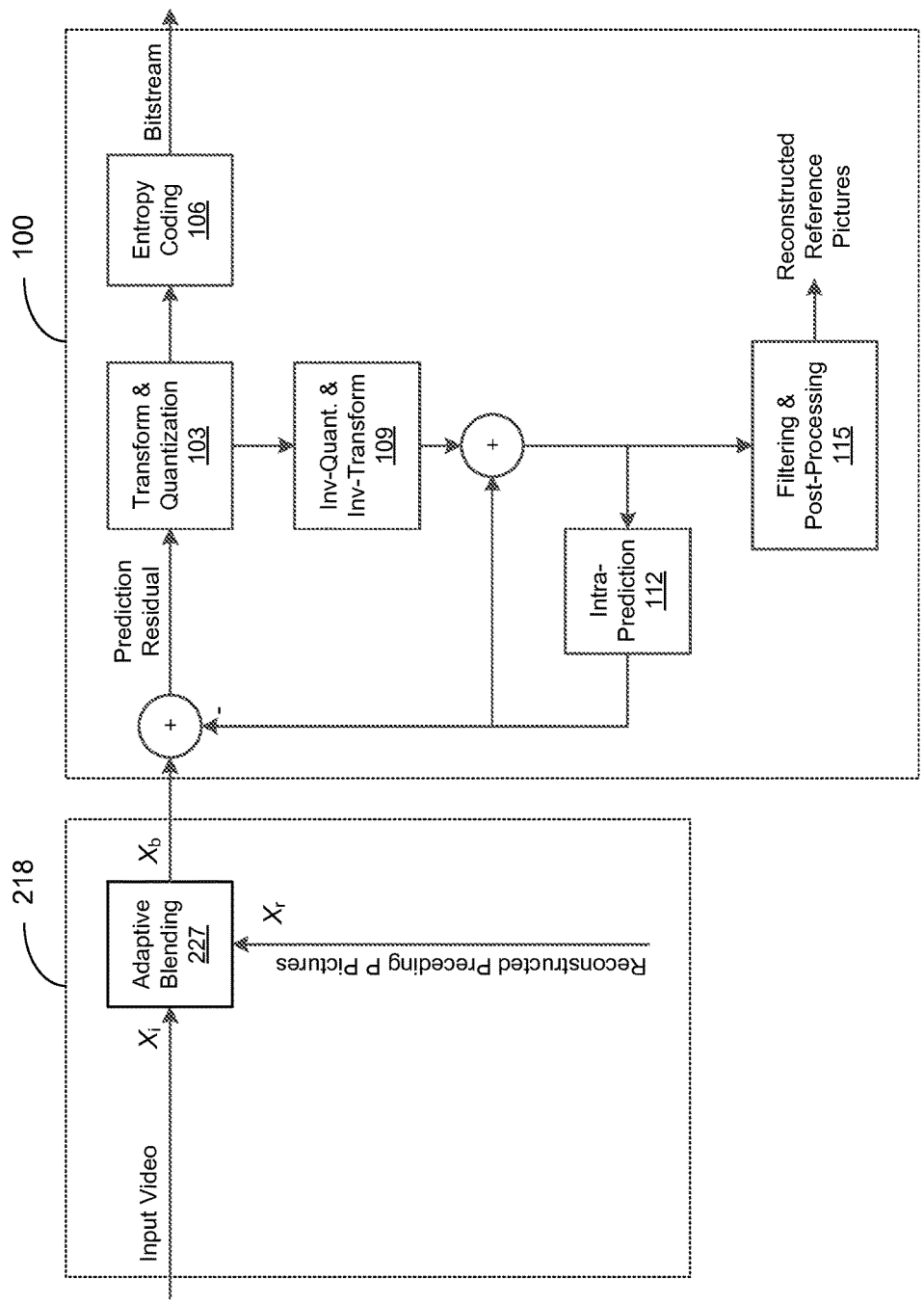

Referring now to FIG. 2, shown is a graphical representation of another example of video encoding for I pictures in accordance with various embodiments of the present disclosure. FIG. 2 may also represent at least a portion of an encoder or transcoder including processing circuitry that implements encoding functions such as those illustrated. To reduce or eliminate the I-pulsing artifacts, adaptive pre-processing 218 may be applied for I pictures of the video stream. In the example of FIG. 2, motion compensation is not utilized to produce a motion compensated picture as in FIG. 1. Instead, the adaptive blending module 227 may replace some or all of an input video picture with a blended combination of a corresponding portion of the reconstructed preceding picture and the input video picture to produce the blended (or modified) picture that is encoded by intra-encoding 100 as the I picture. The intra-encoding output is still standard-compatible and can be decoded by any standard decoder without any change and is transparent to the decoder.

The replacement of at least a portion of the input video picture may be adaptive based at least in part upon characteristics of the input video picture. For example, if a reconstructed preceding P picture (or the preceding input video picture corresponding to the reconstructed preceding P picture) is similar to an input I picture, the adaptive blending module 227 may utilize a blend factor such that the reconstructed P picture substantially replaces the input I picture for encoding by intra-encoding 100. The selection of blend factor value may be based upon comparison of one or more characteristics of the preceding P picture and the input video I picture and/or a corresponding portion of the preceding P picture and the input video I picture. If the blend factor selected causes the blending to use only the reconstructed previous picture, the pixels ($X_i$) of the input video picture are replaced by the pixels ($X_r$) of the reconstructed preceding P picture such that $X_b=X_r$. This may also be carried out on a CU, MB, and/or other region size basis. For instance, if a portion of the reconstructed preceding P picture is similar to a corresponding portion of the input video I picture, a blend factor may be selected that results in that portion of the P picture substantially replacing the corresponding portion of the input video I picture, resulting in a blended picture for encoding as the I picture. If the two pictures are not similar, a blend factor may be selected that results in the original input video picture being used for intra-encoding 100 without substantial replacement.

Figure 3:
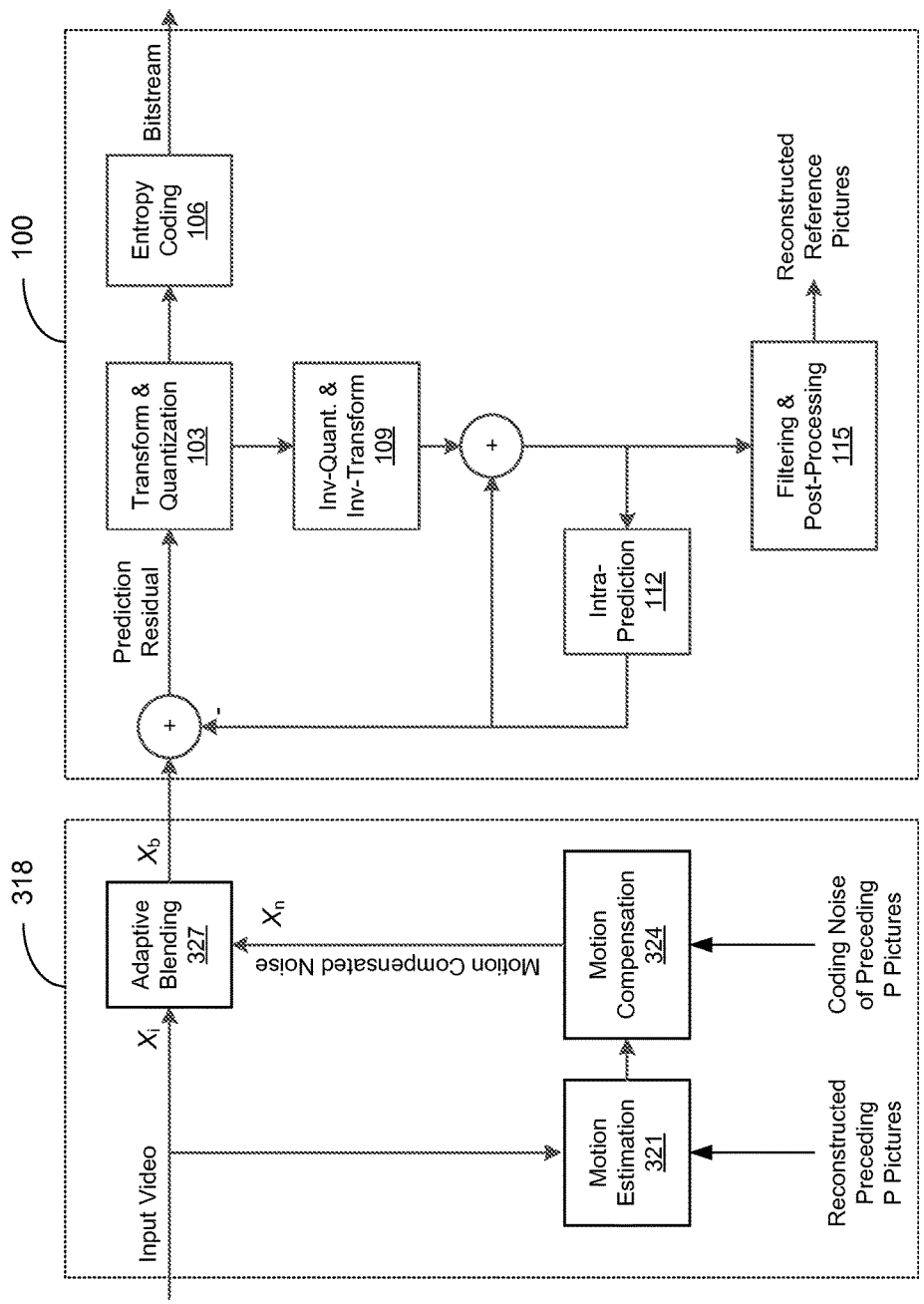

Referring now to FIG. 3, shown is a graphical representation of another example of video encoding for I pictures in accordance with various embodiments of the present disclosure. FIG. 3 may also represent at least a portion of an encoder or transcoder including processing circuitry that implements encoding functions such as those illustrated. To reduce or eliminate the I-pulsing artifacts, adaptive pre-processing 318 may be applied for I pictures of the video stream. In the example of FIG. 3, coding noise of the reconstructed picture preceding an I picture (e.g., a reconstructed P picture) is used to modify the input video picture for intra-encoding 100 as the I picture. At least a portion of a motion compensated version of the coding noise may be added to the input video picture.

Motion estimation is carried out by, e.g., the motion estimation module 321 on an input video picture using the reconstructed preceding P picture as a reference. One or more motion vectors (MVs) are generated for each MB, CU and/or other region of the image. The motion compensation module 324 may then motion compensate the coding noise of the reconstructed preceding P picture using the estimated MVs. The adaptive blending module 327 may then add a portion of the motion compensated coding noise to at least a corresponding portion of the input video picture before providing the blended (or modified) picture for intra-encoding 100. In some cases, the coding noise is scaled before combining with the input video picture. The intra-encoding output is still standard-compatible and can be decoded by any standard decoder without any change and is transparent to the decoder.

Coding noise may be generated during the encoding process of the preceding picture, from the encoded preceding picture, or may be based upon the reconstructed preceding picture. The coding noise of the preceding P picture may be stored or re-created by the encoder. In one approach, among others, when the preceding P picture is encoded, the coding noise is determined by subtracting the original input video version of the P picture from the reconstructed version of the same P picture, resulting in the coding noise signal. The coding noise signal may then be stored directly for subsequent access or it may be compressed to reduce memory space and memory bandwidth before storing. Such compression may use any convenient compression technique, such as for example the compression disclosed in U.S. patent application Ser. No. 12/720,273, entitled "Lossless and near-lossless image compression" and filed on Mar. 10, 2010, which is hereby incorporated by reference in its entirety. For example, FIGS. 2 and 3 and the associated description of U.S. patent application Ser. No. 12/720,273 disclose a video encoder that utilizes prediction and quantization for image compression. Other examples of suitable compression methods include the intra coding method of H.264/AVC, or JPEG. The encoder subsequently reads the coding noise signal and decompresses it if it has been compressed. Motion compensation is carried out by, e.g., the motion compensation module 324 on the coding noise using MVs from the motion estimation module 321. The adaptive blending module 327 may adjust the coding noise by a scale (or weight) factor before adding the motion compensated coding noise signal to at least a portion of the input video picture to produce the blended (or modified) picture for intra-encoding 100.

In another approach, the encoder retains a copy in memory of the original input video picture that is coded as the preceding P picture. The encoder decodes the coded P picture and subtracts from the result the retained copy of the original input video version of the P picture to re-create the coding noise for motion compensation and blending. Which approach is utilized may be based at least in part upon the cost or processing impact of the approaches.

In some implementations, the addition of the motion compensated coding noise is determined by, e.g., the adaptive blending module 327 based at least in part upon a motion compensated difference between the original input video picture and the reconstructed preceding P picture. The motion compensated noise may also be multiplied by a scale (or weight) factor prior to adding to the original input video picture. For example, the pixels of the blended picture may be given by:

$$X_b = X_i + \beta \cdot X_n \qquad \text{EQN (3)}$$

where $\beta$ is the scale (or weight) factor and $X_n$ is the coding noise for the corresponding pixels. The value of the scale factor may be adjusted to emphasize or de-emphasize the degree to which the input video picture is modified by the coding noise. The scale (or weight) factor may be equal to 1 (i.e., no adjustment of the coding noise), less than 1, or greater than 1. In some cases, coding noise may not be added by setting the scale factor to zero. The scale factor may be adapted based upon one or more variables associated with each MB, CU and/or other region of the image. A function defining the scale factor may be based upon one or more variables corresponding to the MB, CU and/or other region. For example, the scale factor may be adapted based at least in part upon, e.g., the magnitude of the MVs that are found for each MB, CU and/or other region, the consistency of the MVs, the value of the quantization parameter (QP) to be applied to each MB, CU and/or other region, the amount of detail or activity in each MB, CU or other region, etc. as discussed above.

Figure 4:
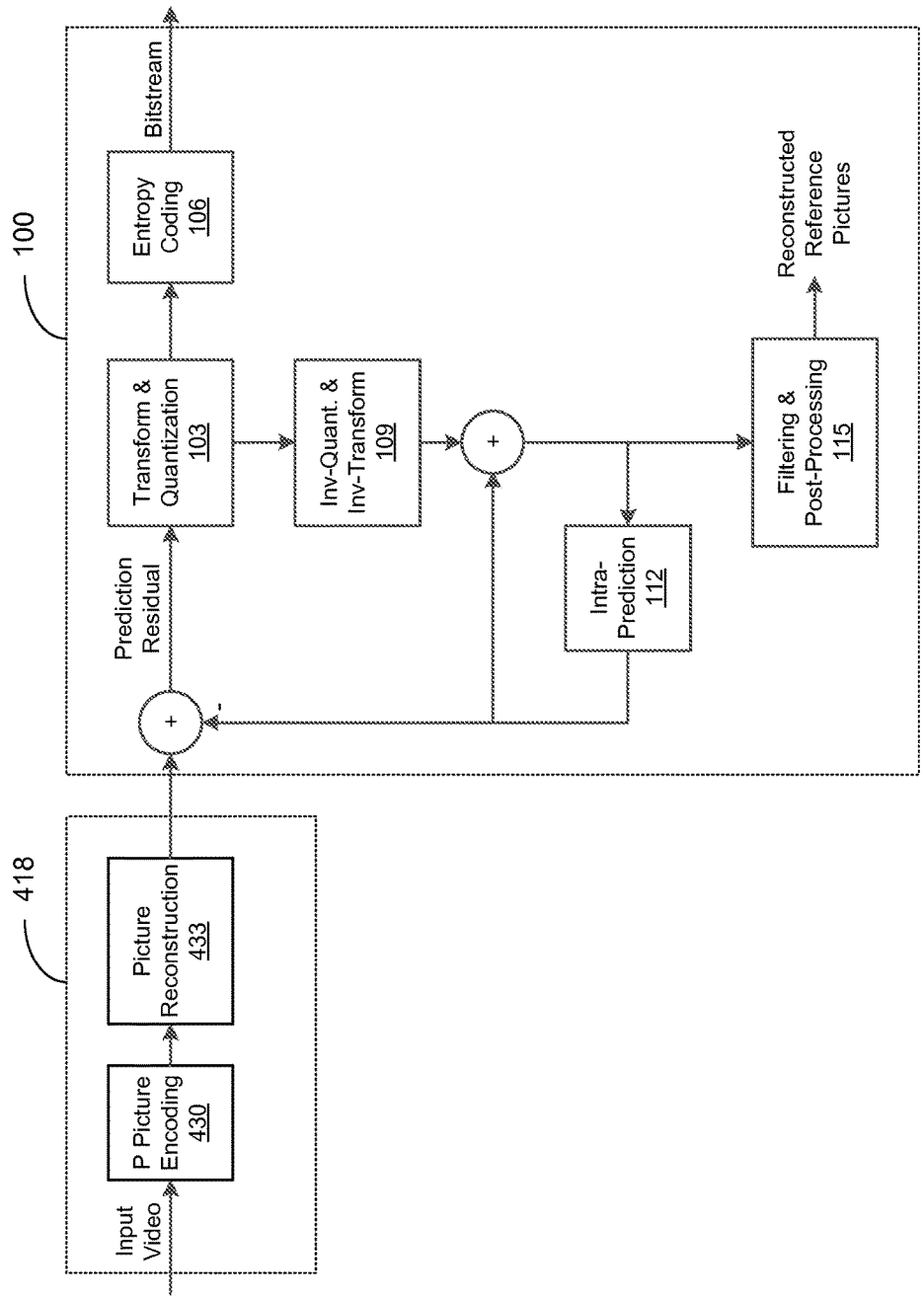

Referring next to FIG. 4, shown is a graphical representation of another example of video encoding for I pictures in accordance with various embodiments of the present disclosure. FIG. 4 may also represent at least a portion of an encoder or transcoder including processing circuitry that implements encoding functions such as those illustrated. To reduce or eliminate the I-pulsing artifacts, adaptive pre-processing 418 may be applied for I pictures of the video stream. In the example of FIG. 4, an input video picture is encoded as a P picture by, e.g., a P picture encoding module 430 based upon a preceding picture. The encoded P picture is then reconstructed by, e.g., a picture reconstruction module 433 to produce a reconstructed P picture (or modified picture) that is encoded by intra-encoding 100 as the I picture. The intra-encoding output is still standard-compatible and can be decoded by any standard decoder without any change and is transparent to the decoder. Coding the input video picture first as a P picture by the P picture encoding module 430 causes the reconstructed P picture, resulting from picture reconstruction by the picture reconstruction module 433, to comprise coding noise with a similar character to the coding noise of a preceding P picture. Encoding the reconstructed P picture as an I picture causes the encoded I picture to incorporate at least a portion of the coding noise of the reconstructed P picture, resulting in a character of coding noise that is subjectively similar to that of a preceding P picture.

Monitoring of the received input video pictures can be carried out by the adaptive pre-processing to identify when an input video picture is to be encoded as an I picture based on, e.g., the GOP pattern. In this case, the identified input video picture would be encoded twice—first as a P picture and second as an I picture. Thus, the encoding time for the identified input video picture may be approximately doubled to produce the I picture. For systems without real-time constraints, the additional time to process the I picture would not impact operation. For systems that are operating with real-time constraints having sufficient margin, the system can accommodate the increased time to encode the identified input pictures. For example, a system may encode other pictures slightly faster than the rate at which those pictures arrive and delaying the output of those other encoded pictures to compensate for the delay in encoding the identified input pictures. For systems that are operating with real-time constraints having little or no margin, the additional encoding time could potentially cause pictures to be dropped to maintain the throughput of the system. This may be avoided if the system is designed with sufficient operating margin to account for the additional encoding.

Figure 5:
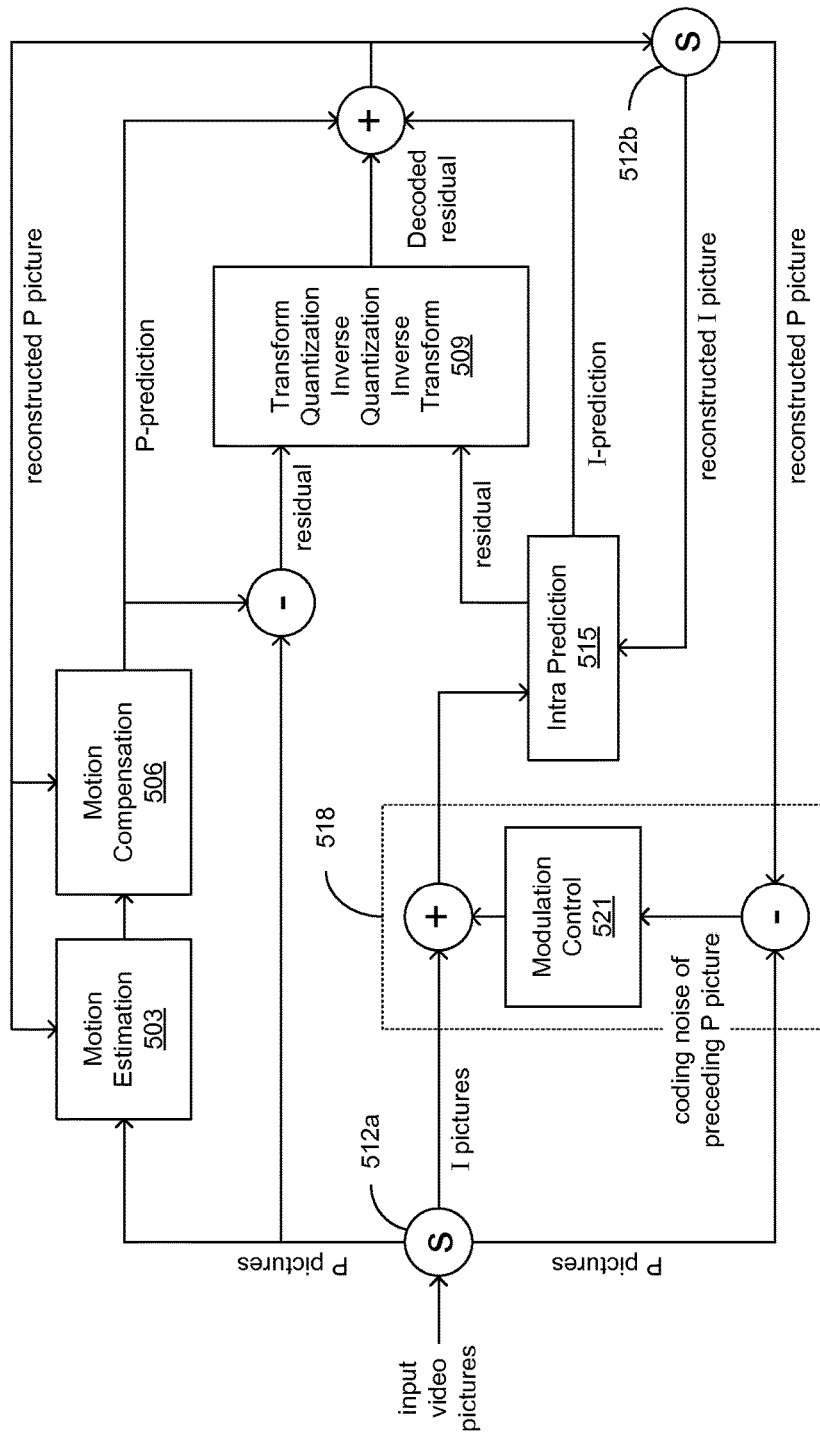

Referring now to FIG. 5, shown is a graphical representation of another example of video encoding for I pictures using coding noise in accordance with various embodiments of the present disclosure. FIG. 5 may also represent at least a portion of an encoder or transcoder including processing circuitry that implements encoding functions such as those illustrated. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute encoding functions.

FIG. 5 illustrates the addition of coding noise of the preceding P picture to the following I picture. The input video pictures can be classified as, e.g., an inter-encoded (P) picture or intra-encoded (I) picture according to the group of pictures (GOP) pattern. If the input video picture is a P picture, the inter prediction (P prediction) is found by, e.g., a motion estimation module 503 and a motion compensation module 506. The residual is found by subtracting the P-prediction from the original input video P picture. After operations of transform, quantization, inverse quantization, and inverse transform by, e.g., module 509, the decoded residual is determined. Adding the P-prediction to the decoded residual leads to the reconstructed P picture. If the input video P picture precedes an I picture, switch 512a directs the original input video P picture and switch 512b directs the corresponding reconstructed P picture to the adaptive pre-processing 518 where the coding noise is found by subtracting the reconstructed P picture from the original input video P picture. At least a portion of the coding noise may then be added to the input video I picture before intra prediction by the intra prediction module 515 for intra-encoding of the modified or blended picture. For different standards (e.g., H.264/AVC or HEVC), the specific operations for transform and quantization, entropy coding, inverse quantization and inverse transform and/or intra-prediction may be slightly different.

The coding noise of the reconstructed preceding P picture can be modulated before adding the coding noise to the input video I picture by, e.g., a modulation control module 521. Because I-pulsing artifacts are most visible in static areas, in some implementations the coding noise is only added to static areas. A static area (e.g., CU, MB, or other region of the image) may be determined based at least in part upon, e.g., the corresponding MV. For example, the MV for each CU, MB, or other region may be evaluated by the modulation control module 521 by comparing it to a predefined threshold or limit. This can be identified using, e.g., coarse motion estimation (CME) of the CU, MB, or other region, which is not shown in FIG. 5. The MV may be provided by, e.g., motion estimation module 503 or other motion estimation that may be available. If the MV is zero or below and/or equal to the defined limit, then the CU, MB, or other region can be considered to be a static area and the corresponding coding noise may be added to the corresponding CU, MB, or other region of the input video I picture. If the MV is above the defined limit, then the CU, MB, or other region can be considered not to be static and the corresponding coding noise is not added that area of the I picture.

The coding noise may also be modulated by a scale (or weight) factor, which may be a function of, e.g., the magnitude of MV of the corresponding CU, MB, or other region. The function may be inversely related to the magnitude of the MV. For example, a smaller weight may be used in a CU, MB, or other region with a larger motion vector. In some cases, the scale factor may be limited to a predefined value.

In other implementations, the coding noise may be motion compensated similar to that described in FIG. 3. Instead of adding the co-located coding noise, the coding noise can also be added based upon a MV determined using, e.g., fine motion estimation (FME). The motion compensated coding noise may be scaled by the scale factor and added to the corresponding CU, MB, or other region of the input video I picture.

Figure 6:
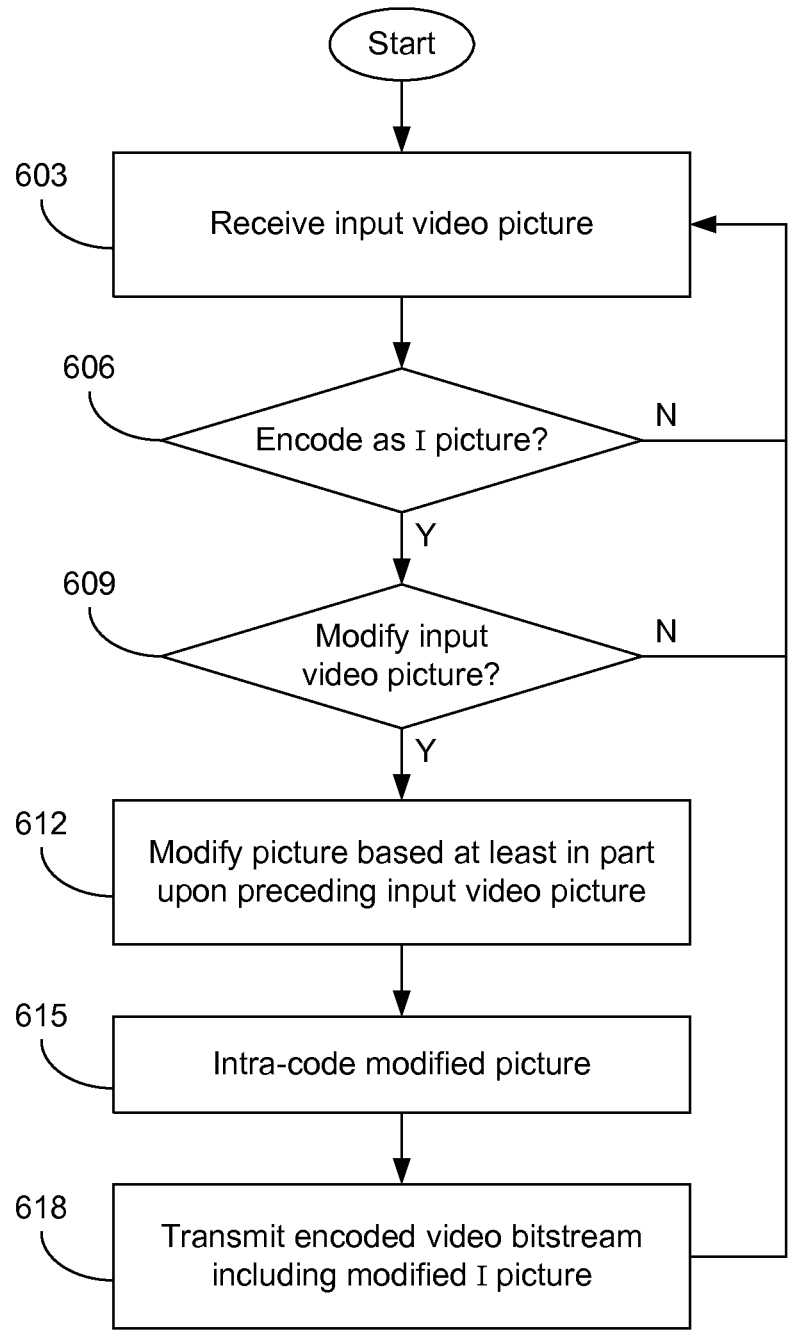
FIG. 6 is a flow chart illustrating an example of I-pulsing reduction in accordance with various embodiments of the present disclosure.

Referring next to FIG. 6, shown is a flow chart illustrating an example of I-pulsing reduction. Beginning with 603, an input video picture of a series of input video pictures is received by adaptive pre-processing circuitry of an encoder or transcoder. Monitoring of the received input video pictures is carried out by the adaptive pre-processing to determine when an I picture is to be encoded based on, e.g., the GOP pattern. When the received input video picture is to be encoded as an I picture in 606, then it may be determined if at least a portion of the input video picture should be modified in 609. For example, if the amount of detail and/or activity is relatively high, then I-pulsing artifacts may not be visible to a viewer and modification of the input video picture may not be needed.

The input video picture may be modified in 612 based at least in part upon the preceding output video picture. For example, the modification may be based at least in part upon a P picture that immediately precedes the I picture in the series of output video pictures. Modification of the input video I picture may be based upon a reconstructed version of the preceding output picture, a motion compensated version of the reconstructed preceding output picture, a motion compensated residual, and/or coding noise corresponding to the reconstructed preceding output picture as previously discussed. Blending and/or scaling may be applied to modify the input video I picture. In other implementations, the input video picture can be modified 612 by first encoding it as a P picture based at least in part upon the preceding output picture and then reconstructing the encoded picture to provide a modified picture. The modified picture may then be intra-coded in 615 and included as part of the output video bitstream. The encoded video bitstream including the encoded modified I picture may be transmitted in 618. The encoded output is standard-compatible and can be decoded by any standard decoder without any change and thus is transparent to the decoder.

Figure 7:
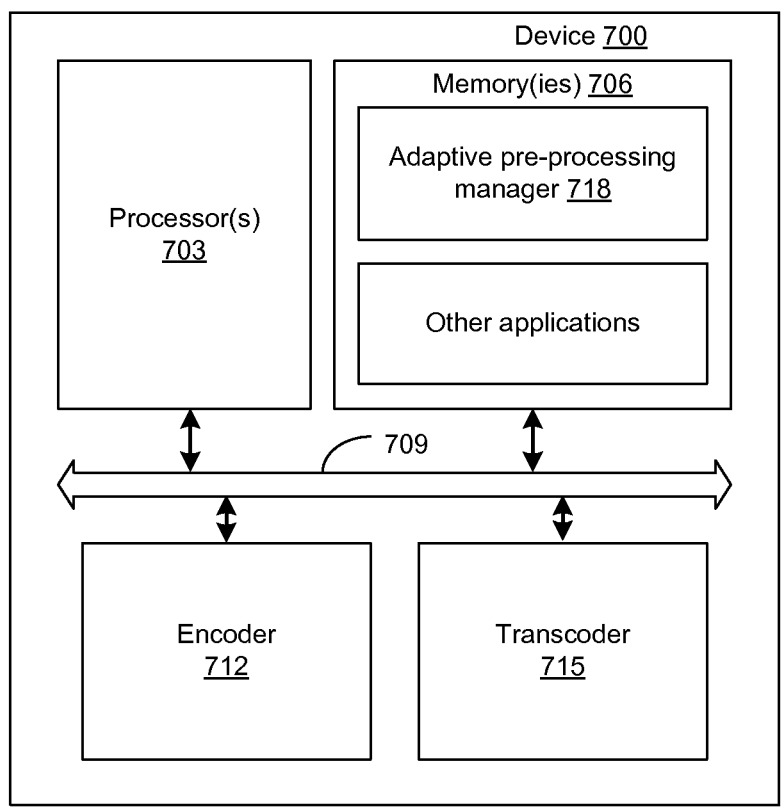
FIG. 7 is a schematic block diagram illustrating an example of a device including a video (or media processing) architecture for encoding and/or transcoding of video or other media streams in accordance with various embodiments of the present disclosure.

With reference to FIG. 7, shown is a schematic block diagram of a device including a video (or media processing) architecture for encoding and/or transcoding of video or other media streams in accordance with various embodiments of the present disclosure. Modules of the examples of FIGS. 1-5 can be implemented in hardware, software, firmware, or a combination thereof. In some embodiments, functions of two or more modules may be implemented by a single module.

The device 700 includes at least one processor circuit, for example, having a processor 703 and a memory 706, both of which are coupled to a local interface 709. The device 700 may include processing circuitry for implementing a encoder 712 and/or transcoder 715, all of which may be coupled to the local interface 709. In various embodiments, the processing circuitry is implemented as at least a portion of a microprocessor. The processing circuitry may be implemented using one or more circuits, one or more microprocessors, application specific integrated circuits, dedicated hardware, digital signal processors, microcomputers, central processing units, field programmable gate arrays, programmable logic devices, state machines, or any combination thereof. In yet other embodiments, the processing circuitry may include one or more software modules executable within one or more processing circuits. The processing circuitry may further include memory configured to store instructions and/or code that causes the processing circuitry to execute data communication functions. In some cases, portions of the encoder 712 and/or transcoder 715 may be implemented by processor 703 via local interface 709. The local interface 709 may comprise, for example, a data bus with an accompanying address/control bus or other bus structure as can be appreciated.

Stored in the memory 706 are both data and several components that are executable by the processor 703 and/or by processing circuitry of the encoder 712 and/or transcoder 715. In particular, stored in the memory 706 and executable by the processor 703 and/or by processing circuitry of the encoder 712 and/or transcoder 715 may be an adaptive pre-processing manager 718 and potentially other applications and device interfaces. In addition, an operating system may be stored in the memory 706 and executable by the processor 703 or other processing circuitry of the device 700. In some cases, the processor 703 and memory 706 may be integrated as a system-on-a-chip.

It is understood that there may be other applications that are stored in the memory and are executable by the processor 703 or other processing circuitry of the device 700 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components can be stored in the memory and are executable by the processor 703 or other processing circuitry of the device 700. In this respect, the term "executable" means a program file that is in a form that can ultimately be run by the processor 703 or other processing circuitry of the device 700. Examples of executable programs may be, for example, a compiled program that can be translated into machine code in a format that can be loaded into a random access portion of the memory 706 and run by the processor 703, source code that may be expressed in proper format such as object code that is capable of being loaded into a random access portion of the memory 706 and executed by the processor 703, or source code that may be interpreted by another executable program to generate instructions in a random access portion of the memory 706 to be executed by the processor 703, etc. An executable program may be stored in any portion or component of the memory including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory is defined herein as including both volatile and nonvolatile memory and data storage components. Volatile components are those that do not retain data values upon loss of power. Nonvolatile components are those that retain data upon a loss of power. Thus, the memory 706 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 703 may represent multiple processors 703 and the memory 706 may represent multiple memories 706 that operate in parallel processing circuits, respectively. In such a case, the local interface 709 may be an appropriate network that facilitates communication between any two of the multiple processors 703, between any processor 703 and any of the memories 706, or between any two of the memories 706, etc. The local interface 709 may comprise additional systems designed to coordinate this communication, including, for example, performing load balancing. The processor 703 may be of electrical or of some other available construction.

Although the adaptive pre-processing manager 718 and other various systems described herein may be embodied in software or code executed by general purpose hardware, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 6 shows the functionality and operation of an implementation of portions of the adaptive pre-processing manager 718 and/or logic implemented by processing circuitry of the device 700. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 703 in a computer system or other system. The machine code may be converted from the source code, etc. If embodied in hardware, each block may represent a circuit or a number of interconnected circuits to implement the specified logical function(s).

Although the flowchart of FIG. 6 shows a specific order of execution, it is understood that the order of execution may differ from that which is depicted. For example, the order of execution of two or more blocks may be scrambled relative to the order shown. Also, two or more blocks shown in succession in FIG. 6 may be executed concurrently or with partial concurrence. Further, in some embodiments, one or more of the blocks shown in FIG. 6 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the adaptive pre-processing manager 718 that comprises software or code can be embodied in any non-transitory computer-readable medium for use by or in connection with an instruction execution system such as, for example, a processor 703 and/or by processing circuitry of the encoder 712 and/or transcoder 715 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A method for encoding video, comprising:
    modifying at least a portion of one picture of a series of video pictures based at least in part upon coding noise associated with a picture of the series of video pictures that precedes the one picture; and
    intra-coding the modified picture to generate an intra-coded (I) picture for inclusion in the series of encoded pictures.

2. The method of claim 1, wherein modifying at least a portion of the one picture reduces an I-pulsing artifact associated with the I picture.

3. The method of claim 1, wherein the preceding picture is encoded as an inter-coded (P or B) picture.

4. The method of claim 3, wherein the one picture is modified based at least in part upon a reconstructed version of the encoded preceding picture.

5. The method of claim 4, wherein the one picture is modified based at least in part upon a motion compensated version of the reconstructed preceding picture.

6. The method of claim 5, wherein modifying the at least a portion of the one picture comprises blending a portion of the one picture with a corresponding portion of the motion compensated reconstructed preceding picture based upon a blending factor.

7. The method of claim 6, comprising:
    determining a motion compensated residual based upon a difference between the portion of the one picture and the corresponding portion of the motion compensated reconstructed preceding picture; and
    determining the blending factor based at least in part upon the motion compensated residual.

8. The method of claim 3, comprising determining the coding noise of the preceding picture, wherein the one picture is modified based at least in part upon a motion compensated version of the coding noise.

9. The method of claim 8, wherein the modification based on the coding noise comprises adjusting the coding noise by a scale factor, wherein the scale factor is based at least in part upon a motion vector associated with the corresponding portion of the motion compensated reconstructed preceding picture.

10. The method of claim 8, wherein the modification based on the coding noise comprises adjusting the coding noise by a scale factor, wherein the scale factor is based at least in part upon a quantization parameter (QP) associated with the portion of the one picture.

11. The method of claim 4, wherein modifying the at least a portion of the one picture comprises blending a portion of the one picture with a corresponding portion of the reconstructed preceding picture.

12. The method of claim 1, wherein the coding noise is generated during encoding of the preceding picture.

13. The method of claim 1, wherein modifying the at least a portion of the one picture comprises:
encoding the one picture as a predicted (P) picture; and
reconstructing the P picture to generate the modified picture.

14. An encoder, comprising:
adaptive pre-processing circuitry configured to:
receive a series of video pictures including a picture to be encoded as an intra-coded (I) picture, and
modify at least a portion of the picture to be encoded as the I picture based at least in part upon coding noise associated with a picture of the series of video pictures that precedes the picture to be encoded as the I picture; and
intra-encoding processing circuitry configured to encode the modified picture to generate the I picture.

15. The encoder of claim 14, wherein the coding noise is the difference between the preceding picture and a reconstructed version of the preceding picture.

16. The encoder of claim 15, wherein the adaptive pre-processing circuitry comprises a modulation control configured to adjust at least a portion of the coding noise based at least in part upon a motion vector associated with a corresponding portion of the preceding picture.

17. The encoder of claim 16, wherein the motion vector is determined by coarse motion estimation.

18. The encoder of claim 15, wherein the adaptive pre-processing circuitry is configured to motion compensate the coding noise prior to modifying the at least a portion of the picture to be encoded as the I picture.

19. The encoder of claim 18, wherein the motion compensation is based upon fine motion estimation.

20. An encoder, comprising:
adaptive pre-processing circuitry configured to modify at least a portion of a video picture for encoding as an intra-coded (I) picture, where the at least a portion of the video picture is modified based at least in part upon a coding noise of a reconstructed picture that precedes the I picture in a series of encoded video pictures; and
intra-encoding processing circuitry configured to encode the modified video picture as the I picture.

21. The encoder of claim 20, wherein the adaptive pre-processing circuitry is configured to blend a portion of the reconstructed preceding picture with a corresponding portion of the video picture to generate the modified video picture.

22. The encoder of claim 20, wherein the adaptive pre-processing circuitry is configured to encode the video picture as a predicted (P) picture and reconstruct the P picture to generate the modified video picture.

* * * * *